(12) United States Patent
Hardwicke et al.

(10) Patent No.: US 9,745,849 B2
(45) Date of Patent: Aug. 29, 2017

(54) METHODS FOR TREATING FIELD OPERATED COMPONENTS

(71) Applicant: GENERAL ELECTRIC COMPANY, Schenectady, NY (US)

(72) Inventors: Canan Uslu Hardwicke, Simposonville, SC (US); John McConnell Delvaux, Fountain Inn, SC (US); Jason Robert Parolini, Greer, SC (US); Matthew Troy Hafner, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 14/752,186

(22) Filed: Jun. 26, 2015

(65) Prior Publication Data

US 2016/0376893 A1    Dec. 29, 2016

(51) Int. Cl.
*B29C 65/54* (2006.01)
*B29C 73/14* (2006.01)
(Continued)

(52) U.S. Cl.
CPC ............... *F01D 5/14* (2013.01); *B23P 6/005* (2013.01); *B29C 65/002* (2013.01); *B29C 65/02* (2013.01);
(Continued)

(58) Field of Classification Search
USPC ... 156/94, 98, 101, 104, 105, 249, 250, 258, 156/266, 267, 306.6, 306.9, 307.1, 308.2,
(Continued)

(56) References Cited

U.S. PATENT DOCUMENTS 3,797,085 A    3/1974 Aartman
3,802,046 A    4/1974 Wachtell et al.
(Continued)

FOREIGN PATENT DOCUMENTS

EP    2236648 A1    10/2010

OTHER PUBLICATIONS

European Search Report and Opinion issued in connection with corresponding EP Application No. 6175272.0 dated Nov. 18, 2016.

*Primary Examiner* — Sing P Chan
(74) *Attorney, Agent, or Firm* — McNees Wallace & Nurick LLC

(57) ABSTRACT

A method for treating a field operated component is disclosed which includes providing the component including a ceramic matrix composite and removing a first portion of the component, forming a first exposed surface on the component. The method further includes providing a second portion including the composite, the second portion having a second exposed surface including a conformation adapted to mate with the first exposed surface. The second portion is positioned in association with the component so as to replace the first portion, and the second portion and the component are joined to form a treated component. Another method is disclosed wherein the component is a turbine component which further includes removing an environmental barrier coating from the component, arranging and conforming the first exposed surface and the second exposed surface to define a joint, and applying an environmental barrier coating to the treated component.

20 Claims, 4 Drawing Sheets

(51) Int. Cl.
  B32B 37/12    (2006.01)
  B32B 38/10    (2006.01)
  B32B 43/00    (2006.01)
  C09J 5/02     (2006.01)
  C09J 5/06     (2006.01)
  F01D 5/14     (2006.01)
  B29C 65/00    (2006.01)
  B29C 65/02    (2006.01)
  B23P 6/00     (2006.01)
  F01D 5/00     (2006.01)
  F01D 5/18     (2006.01)
  F01D 5/28     (2006.01)
  F01D 9/02     (2006.01)
  F01D 25/24    (2006.01)
  F01D 25/30    (2006.01)
  F02K 1/82     (2006.01)
  B29L 31/00    (2006.01)
  B29C 73/04    (2006.01)

(52) U.S. Cl.
  CPC ............. *F01D 5/005* (2013.01); *F01D 5/187* (2013.01); *F01D 5/282* (2013.01); *F01D 5/284* (2013.01); *F01D 5/288* (2013.01); *F01D 9/02* (2013.01); *F01D 25/246* (2013.01); *F01D 25/30* (2013.01); *F02K 1/82* (2013.01); *F02K 1/822* (2013.01); *F02K 1/827* (2013.01); *B29C 73/04* (2013.01); *B29L 2031/7504* (2013.01); *F05D 2230/40* (2013.01); *F05D 2230/60* (2013.01); *F05D 2230/64* (2013.01); *F05D 2300/701* (2013.01); *Y02T 50/675* (2013.01)

(58) Field of Classification Search
  USPC .......................................... 156/308.4, 308.6
  See application file for complete search history.

(56) References Cited

U.S. PATENT DOCUMENTS

| 5,928,448 | A | 7/1999 | Daws |
| 6,042,880 | A | 3/2000 | Rigney et al. |
| 6,154,959 | A | 12/2000 | Goodwater et al. |
| 6,820,334 | B2 | 11/2004 | Kebbede et al. |
| 6,905,308 | B2 | 6/2005 | Hagle et al. |
| 7,185,433 | B2 | 3/2007 | Miller et al. |
| 7,686,577 | B2 | 3/2010 | Morrison et al. |
| 7,888,277 | B2 * | 2/2011 | Riedell ............ B64G 1/58 156/89.11 |
| 8,221,825 | B2 * | 7/2012 | Reitz ............ C23C 24/00 156/155 |
| 2005/0112321 | A1 * | 5/2005 | Millard ............ B32B 18/00 428/98 |
| 2008/0229567 | A1 | 9/2008 | Bublath et al. |
| 2014/0272248 | A1 | 9/2014 | Chamberlain |

* cited by examiner

METHODS FOR TREATING FIELD OPERATED COMPONENTS

FIELD OF THE INVENTION

The present invention is directed to methods for treating field operated components, and treated components. More particularly, the present invention is directed to methods for replacing a portion of a field operated component, and treated components having a replaced portion.

BACKGROUND OF THE INVENTION

Gas turbines are continuously being modified to provide increased efficiency and performance. These modifications include the ability to operate at higher temperatures and under harsher conditions, which often requires material modifications and/or coatings to protect components from such temperatures and conditions. As more modifications are introduced, additional challenges are realized.

One modification to increase performance and efficiency involves forming gas turbine components, such as, but not limited to, shrouds, turbine struts, nozzles/vanes, combustion liners, buckets/blades, shroud rings, exhaust ducts, augmentation liners, and jet exhaust nozzles from a ceramic matrix composite (CMC). CMC turbine components may be subject to degradation in a combustion flow field due to interactions of the CMC with combustion gases, include water, at elevated temperatures. CMC turbine components may also be subject to mechanical or other damage under operating conditions. However, CMC components for gas turbines and other systems may be expensive, and replacing an entire component as a result of localized damage or wear and tear is economically disadvantageous.

BRIEF DESCRIPTION OF THE INVENTION

In an exemplary embodiment, a method for treating a field operated component includes providing the field operated component including a ceramic matrix composite and removing a first portion of the field operated component, forming a first exposed ceramic matrix composite surface on the field operated component. The method further includes providing a second portion including the ceramic matrix composite, the second portion having a second exposed ceramic matrix composite surface including a conformation adapted to mate with the first exposed ceramic matrix composite surface. The second portion is positioned in association with the field operated component so as to replace the first portion, and the second portion and the field operated component are joined to form a treated component.

In another exemplary embodiment, a method for treating a field operated turbine component selected from the group consisting of a shroud, a turbine strut, a nozzle, a combustion liner, a bucket, a shroud ring, an exhaust duct, an augmentation liner, a jet exhaust nozzle, and combinations thereof, includes providing the field operated turbine component including a ceramic matrix composite, removing a first environmental barrier coating from the field operated turbine component, and removing a first portion of the field operated turbine component, forming a first exposed ceramic matrix composite surface on the field operated turbine component. The method further includes providing a second portion including the ceramic matrix composite, the second portion having a second exposed ceramic matrix composite surface including a conformation adapted to mate with the first exposed ceramic matrix composite surface. The second portion is positioned in association with the field operated turbine component so as to replace the first portion. The first exposed ceramic matrix composite surface and the second exposed ceramic matrix composite surface are arranged and conformed to define a joint. The second portion and the field operated turbine component are joined to form a treated turbine component, and a second environmental barrier coating is applied to the treated turbine component.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary components, gas turbine components and methods of forming components and gas turbine components. Embodiments of the present disclosure, in comparison to methods and products not utilizing one or more features disclosed herein, provide a more cost effective and time-efficient method of extending the useful life of a component.

Figure 1:
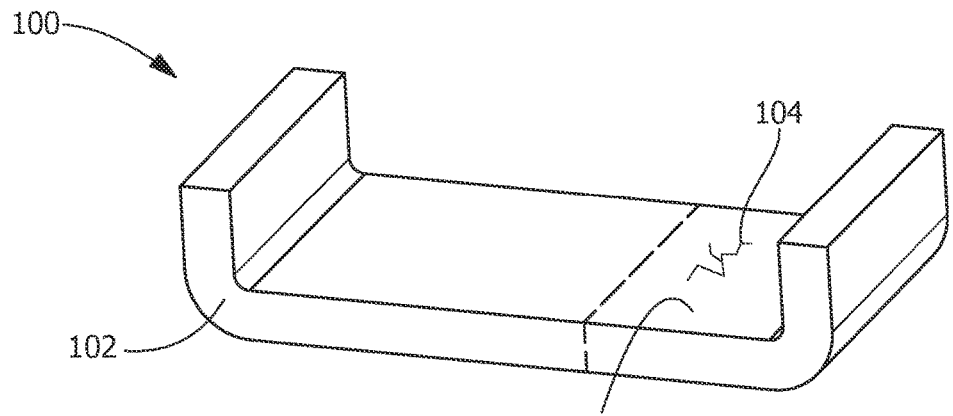
FIG. 1 is a perspective view of a field operated component, according to an embodiment of the present disclosure.

Referring to FIG. 1, a field operated component 100 includes a ceramic matrix composite (CMC) 102. The field operated component 100 further includes a field operated condition 104 localized on a first portion 106 of the field operated component 100.

The field operated component 100 may be any component which includes a CMC 102. In one embodiment, the field operated component 100 is a gas turbine component. In a further embodiment, the field operated component 100 is a gas turbine component, such as, but not limited to, a shroud, a turbine strut, a nozzle (or vane), a combustion liner, a bucket (or blade), a shroud ring, an exhaust duct, an augmentation liner, a jet exhaust nozzle, or a combination thereof.

Examples of the CMC 102 include, but are not limited to, carbon-fiber-reinforced carbon (C/C), carbon-fiber-reinforced silicon carbide (C/SiC), silicon-carbide-fiber-reinforced silicon carbide (SiC/SiC), and alumina-fiber-reinforced alumina ($Al_2O_3/Al_2O_3$), and combinations thereof. The CMC 102 may have increased elongation, fracture toughness, thermal shock, dynamical load capability, and anisotropic properties as compared to a monolithic ceramic structure.

The field operated condition 104 may include any undesirable or detrimental condition, including, but not limited to, damage, cracking, erosion, corrosion, pitting, wear, delamination, oxidation, strain, fatigue, chemical attack, degradation, spallation, fragmentation, weakness, or a combination thereof.

Figure 2:
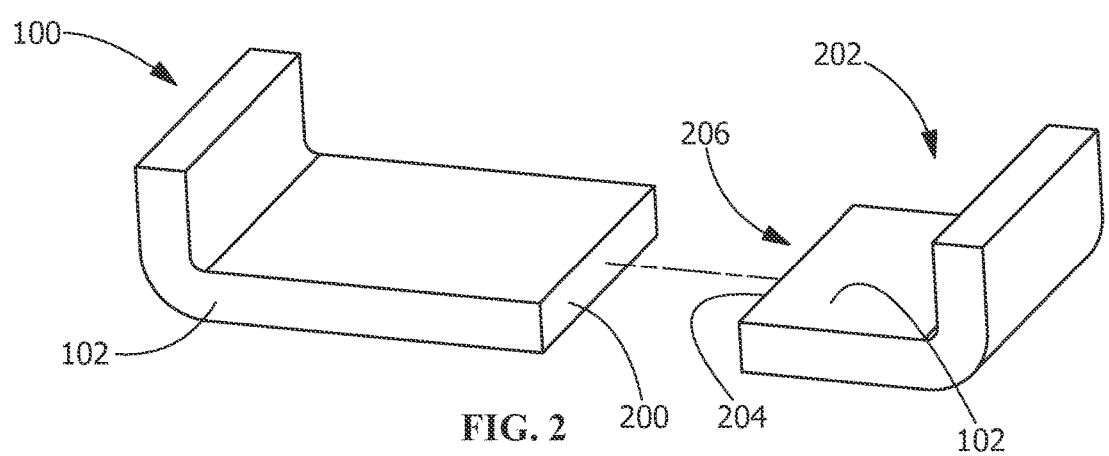
FIG. 2 is a perspective view of the field operated component of FIG. 1 following removal of a first portion in preparation for replacement of the first portion with a second portion, according to an embodiment of the present disclosure.

Referring to FIG. 2, a method for treating the field operated component 100 includes removing the first portion 106 (see FIG. 1) of the field operated component 100, forming a first exposed CMC surface 200 on the field operated component 100. A second portion 202 is provided, the second portion 202 also including the CMC 102. The second portion 202 includes a second exposed CMC surface 204 having a conformation 206 adapted to mate with the first exposed CMC surface 200. The second portion 200 may be repurposed from another field operated component, may be repurposed from a component which has not been previously operated, or may be an incomplete component, specifically fabricated for use in replacing the first portion 106 or utilized opportunistically to replace the first portion 106. The second portion 202 is positioned in association with the field operated component 100 so as to replace the first portion 106.

Figure 3:
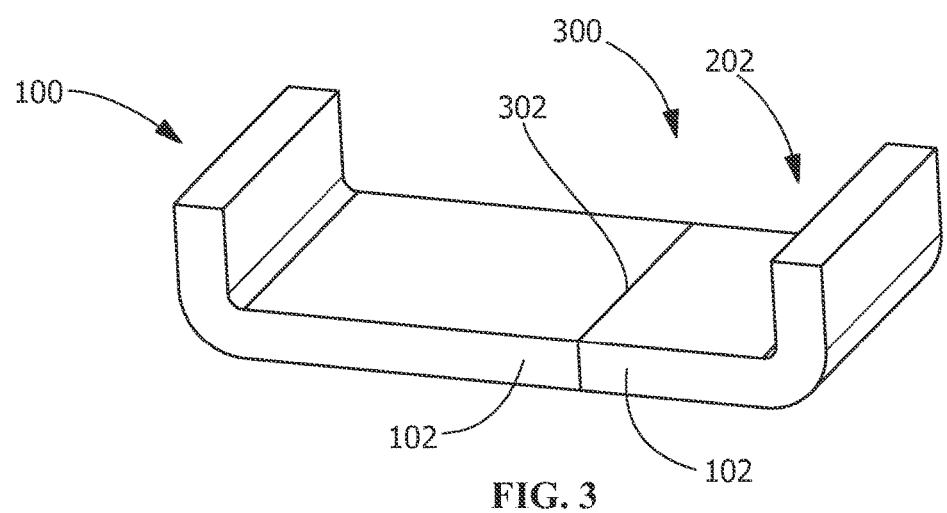
FIG. 3 is a perspective view of a treated component, following replacement of the first portion of the field operated component of FIG. 1 with the second portion of FIG. 2, according to an embodiment of the present disclosure.

Referring to FIG. 3, the second portion 202 is joined at joint 302 to the field operated component 100 to form a treated component 300, wherein each of the field operated component 100 and the second portion 202 includes a ceramic matrix composite 102.

Figure 4:
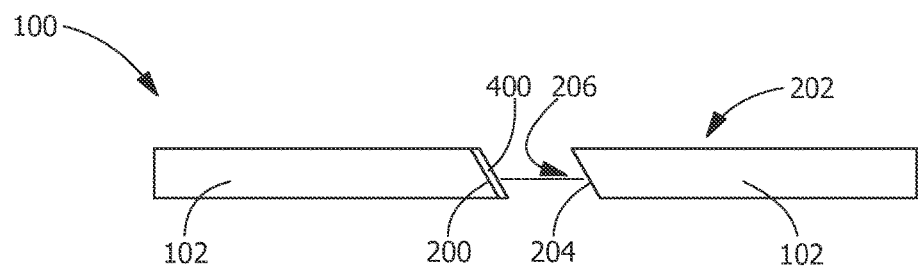
FIG. 4 is a side view of a field operated component following removal of a first portion in preparation for replacement of the first portion with a second portion, according to an embodiment of the present disclosure.

Referring to FIG. 4, a joining material 400 may be applied to at least one of the first exposed CMC surface 200 and the second exposed CMC surface 204 during the joining of the field operated component 100 to the second portion 202. The joining material 400 may include any suitable composition, including, but not limited to, a joining slurry, a fiber reinforced joining slurry, a matrix ply 500 (see FIG. 5), at least one layer of unidirectional tape 502 (see FIG. 5), or combinations thereof. In one embodiment, the joining material 400 includes any suitable material, including, but not limited to, a carbon source, elemental carbon, a hydrocarbon, an alcohol, silicon carbide, or a combination thereof. In another embodiment, joining the second portion 202 and the field operated component 100 includes placing the field operated component 100 and the second portion 202 in a fixture, applying the joining material 400 to at least one of the first exposed CMC surface 200 and the second exposed CMC surface 204, and drying the joining material 400 under a vacuum.

Figure 5:
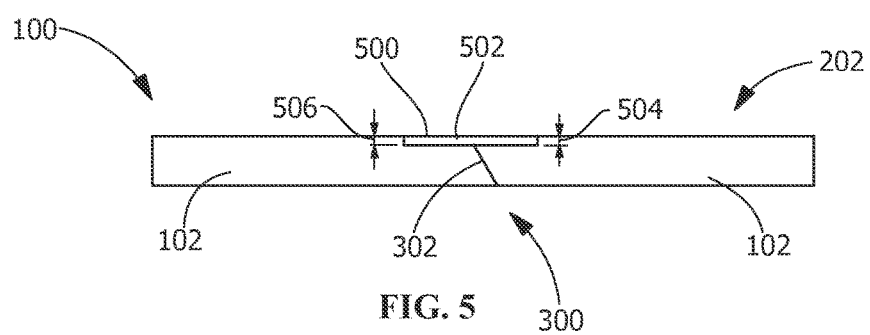
FIG. 5 is a side view of a treated component, following replacement of a first portion of the field operated component with a second portion, according to an embodiment of the present disclosure.

Referring to FIG. 5, joining the second portion 202 and the field operated component 100 may include adding at least one matrix ply 500 over the joint 302 defined by the first exposed CMC surface 200 and the second exposed CMC surface 204. Joining the second portion 202 and the field operated component 106 may further include densifying the at least one fiber reinforced ply 500, the second portion 202 and the field operated component 100. Densifying may include, but is not limited to, melting silicon into a portion of the at least one matrix ply 500, the second portion 202 and the field operated component 100, and reacting the silicon with a carbon source to form silicon carbide, thus solidifying the at least one matrix ply 500, the second portion 202 and the field operated component 100.

In one embodiment, at least one layer of unidirectional tape 502 is disposed between the at least one matrix ply 500 and the joint 302. In a further embodiment, the at least one layer of unidirectional tape 502 includes a plurality of alternating layers of unidirectional ceramic matrix composite tape, each of the plurality of alternating layers alternating fiber orientation at 90° intervals. In another embodiment, the at least one layer of unidirectional tape 502 includes a plurality of alternating layers of unidirectional ceramic matrix composite tape, each of the plurality of alternating layers alternating fiber orientation at 45° intervals. In yet another embodiment, adding the at least one matrix ply 500 and the at least one layer of unidirectional tape 502 includes forming an inset depth 506 in the field operated component 100 and the second portion 202 about equal to a height 504 of the at least one fiber reinforced ply 500 and the at least one layer of unidirectional tape 502. Densifying may further include, densifying the at least one layer of unidirectional tape 502.

In one embodiment, joining the second portion 202 and the field operated component 100 includes applying a joining material 400 to at least one of the first exposed CMC surface 200 and the second exposed CMC surface 204 and adding at least one fiber matrix ply 500 and the at least one unidirectional tape 502 over the joint 302 defined by the first exposed CMC surface 200 and the second exposed CMC surface 204.

Joining the second portion 202 and the field operated component 100 may include any suitable technique, such as, but not limited to, autoclaving, burning out, melt infiltration, local heat treatment, inductive heating, laser heating, or a combination thereof. In one embodiment, following joining, the treated component 300 is subjected to any suitable finishing process, including, but not limited to, machining, polishing, coating or a combination thereof.

In one embodiment, treating the field operated component 100 includes removing a first environmental barrier coating from the field operated component 100. In another embodiment, treating the field operated component 100 includes applying a second environmental bond coating to the treated component 300.

Figure 6:
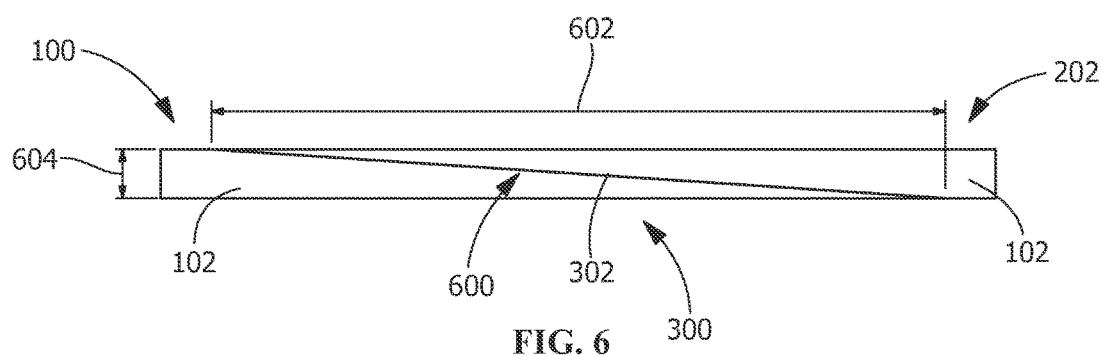
FIG. 6 is a side view of a treated component, following replacement of a first portion of the field operated component with a second portion by a plain scarfed joint, according to an embodiment of the present disclosure.
Figure 7:
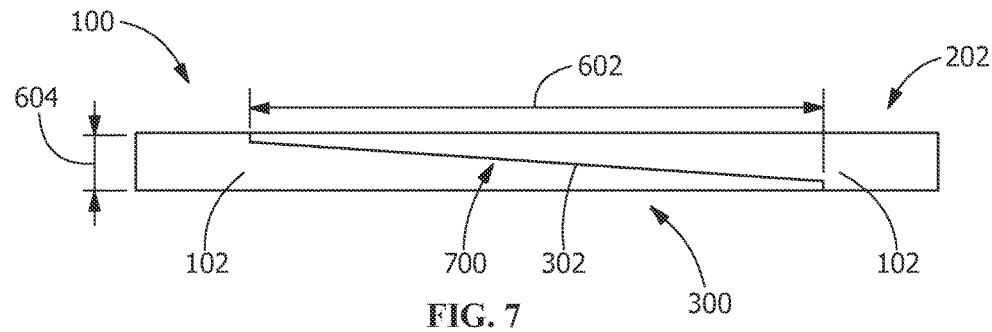
FIG. 7 is a side view of a treated component, following replacement of a first portion of the field operated component with a second portion by a nibbed scarfed joint, according to an embodiment of the present disclosure.
Figure 8:
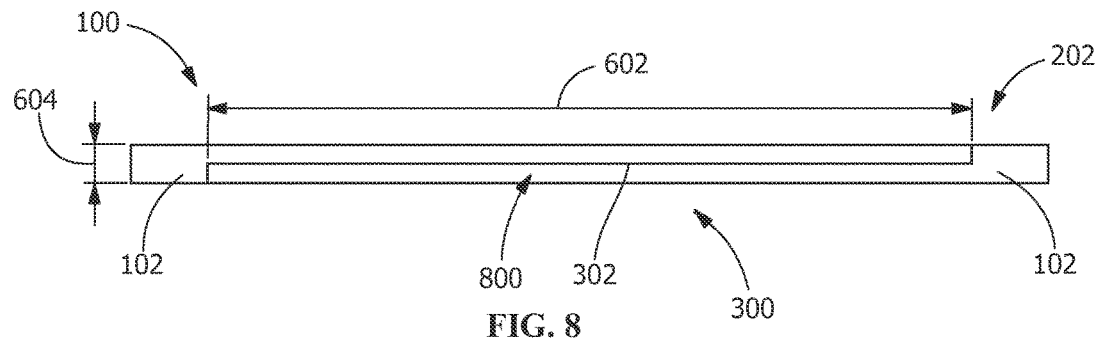
FIG. 8 is a side view of a treated component, following replacement of a first portion of the field operated component with a second portion by a half lap splice joint, according to an embodiment of the present disclosure.
Figure 9:
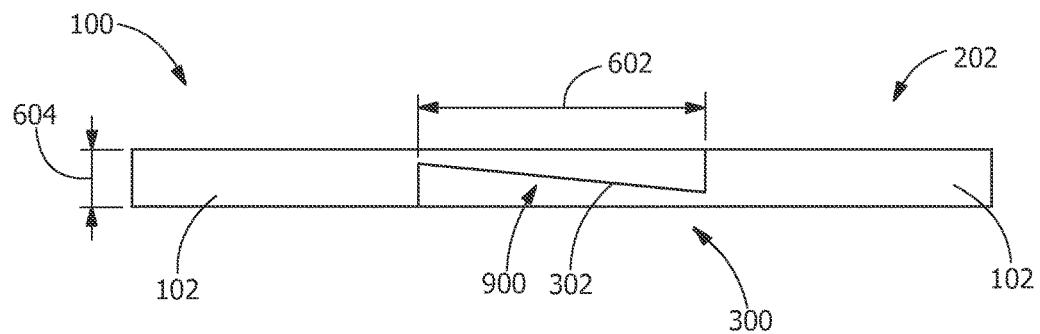
FIG. 9 is a side view of a treated component, following replacement of a first portion of the field operated component with a second portion by a bevel lap splice joint, according to an embodiment of the present disclosure.
Figure 10:
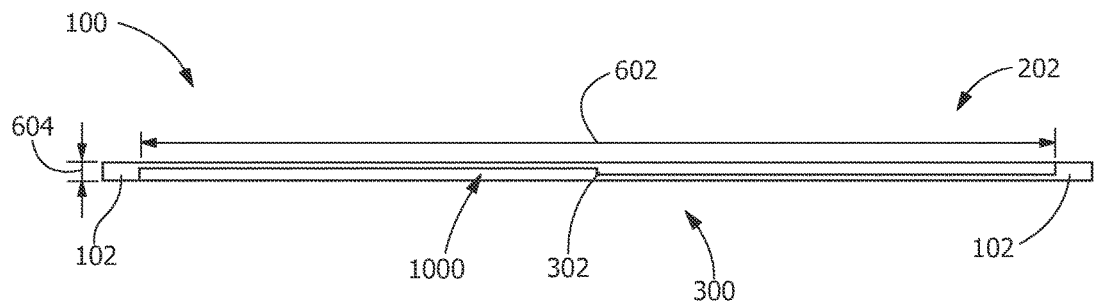
FIG. 10 is a side view of a treated component, following replacement of a first portion of the field operated component with a second portion by a tabled splice joint, according to an embodiment of the present disclosure.
Figure 11:
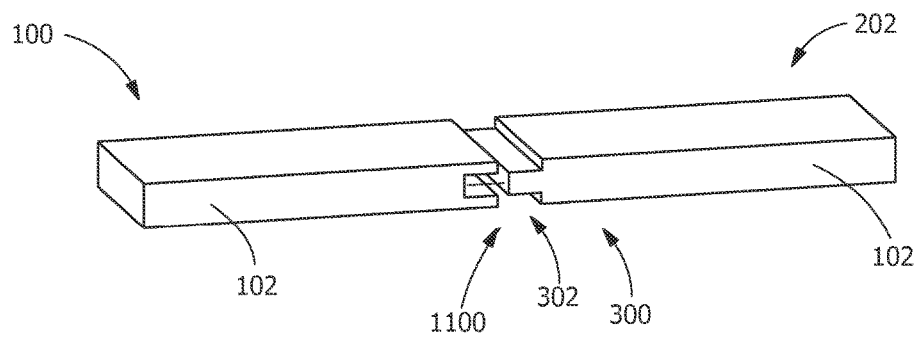
FIG. 11 is a side view of a treated component, following replacement of a first portion of the field operated component with a second portion by a tongue and groove joint, according to an embodiment of the present disclosure.
Figure 12:
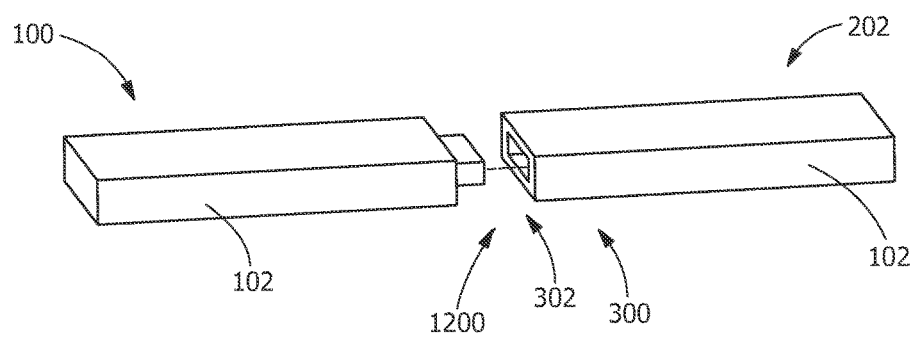
FIG. 12 is a side view of a treated component, following replacement of a first portion of the field operated component with a second portion by a mortise and tenon joint, according to an embodiment of the present disclosure.

Referring to FIGS. 6-12, the first exposed CMC surface 200 and the second exposed CMC surface 204 are arranged and conformed to define a joint 302. The joint may be any suitable joint, including, but not limited to, a butt joint, a bridle joint, a dowel joint, a miter joint, a finger joint, a dovetail joint, a dado joint, a groove joint, a tongue and groove joint, a mortise and tenon joint, a hammer-headed tenon joint, a birdsmouth joint, a lap joint, an end lap joint, a half lap joint, a cross lap joint, a dovetail lap joint, a dovetail crossed lap, a mitred half lap joint, a halved joint, a splice joint, a half lap splice joint, a bevel lap splice joint, a tabled splice joint, a tapered finger splice joint, a wedged tabled spice joint, a saddle joint, a crown of thorns joint, a scarf joint, a plain scarf joint, a nibbed scarf joint, a keyed nibbed scarf joint, or a combination thereof. Referring to FIG. 6, in one embodiment, the joint 302 is a plain scarfed joint 600. Referring to FIG. 7, in another embodiment, the joint 302 is a nibbed scarfed joint 700. Referring to FIG. 8, the joint 302 may be a half-lap splice joint 800. Referring to FIG. 9, in another embodiment, the joint 302 is a bevel lap splice joint 900. Referring to FIG. 10, in yet another embodiment, the joint 302 is a tabled splice joint 1000. Referring to FIG. 11, the joint 302 may be a tongue and groove joint 1100. Referring to FIG. 12, in another embodiment, the joint 302 is a mortise and tenon joint 1200.

Referring to FIGS. 6-10, in one embodiment, the joint 302 is a scarf joint, a plain scarf joint, a nibbed scarf joint, a keyed nibbed scarf joint, a splice joint, a half lap splice joint, a bevel lap splice joint, a tabled splice joint, a tapered finger splice joint, a wedged tabled spice joint or a combination thereof. The joint 302 includes a joint width 602 to joint thickness 604 ratio (w/t ratio) between 0 and about 50, alternatively about 10 to about 20, alternatively about 12 to about 18, alternatively about 10 to about 14, alternatively about 13 to about 17, alternatively about 16 to about 20, alternatively about 15.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for treating a field operated component, the method comprising:
    providing the field operated component including a ceramic matrix composite;
    removing a first portion of the field operated component, forming a first exposed ceramic matrix composite surface on the field operated component;
    providing a second portion including the ceramic matrix composite, the second portion being a repurposed portion of another field operated component, the second portion having a second exposed ceramic matrix composite surface including a conformation adapted to mate with the first exposed ceramic matrix composite surface;
    positioning the second portion in association with the field operated component so as to replace the first portion; and
    joining the second portion and the field operated component to form a treated component.

2. The method of claim 1, wherein the field operated component is a gas turbine component.

3. The method of claim 1, wherein joining the second portion and the field operated component includes applying a joining material to at least one of the first exposed ceramic matrix composite surface and the second exposed ceramic matrix composite surface.

4. The method of claim 3, wherein the joining material includes a material selected from the group consisting of a carbon source, elemental carbon, a hydrocarbon, an alcohol, silicon carbide, and a combination thereof.

5. The method of claim 3, wherein joining the second portion and the field operated component includes drying the joining material under a vacuum.

6. The method of claim 1, wherein joining the second portion and the field operated component includes adding at least one matrix ply over a joint defined by the first exposed ceramic matrix composite surface and the second exposed ceramic matrix composite surface.

7. The method of claim 6, wherein at least one layer of unidirectional tape is disposed between the at least one matrix ply and the joint.

8. The method of claim 7, wherein the at least one layer of unidirectional tape includes a plurality of alternating layers of unidirectional ceramic matrix composite tape, each of the plurality of alternating layers alternating fiber orientation at 90° intervals.

9. The method of claim 7, wherein joining the second portion and the field operated component includes densifying the at least one matrix ply, the at least one layer of unidirectional tape, the second portion and the field operated component.

10. The method of claim 7, wherein adding the at least one matrix ply includes forming an inset depth about equal to a height of the at least one matrix ply and the at least one layer of unidirectional tape.

11. The method of claim 1, wherein the first exposed ceramic matrix composite surface and the second exposed ceramic matrix composite surface are arranged and conformed to define a joint.

12. The method of claim 11, wherein the joint is selected from the group consisting of a scarf joint, a plain scarf joint, a nibbed scarf joint, a keyed nibbed scarf joint, and combinations thereof.

13. The method of claim 12, wherein the joint includes a w/t ratio between about 0 to about 50.

14. The method of claim 1, wherein joining the second portion and the field operated component includes a technique selected from the group consisting of autoclaving, burning out, melt infiltration, local heat treatment, inductive heating, laser heating, and combinations thereof.

15. The method of claim 13, wherein joining the second portion and the field operated component includes melt infiltration.

16. The method of claim 1, wherein the method further includes removing a first environmental barrier coating from the field operated component.

17. The method of claim 1, wherein the method further includes applying a second environmental bond coating to the treated component.

18. The method of claim 1, wherein the method further includes machining a surface of the treated component.

19. A method for treating a field operated turbine component, the method comprising:
    providing the field operated turbine component selected from the group consisting of a shroud, a turbine strut, a nozzle, a combustion liner, a bucket, a shroud ring, an exhaust duct, an augmentation liner, a jet exhaust nozzle, and combinations thereof, the field operated turbine component including a ceramic matrix composite;
    removing a first environmental barrier coating from the field operated turbine component;
    removing a first portion of the field operated turbine component, forming a first exposed ceramic matrix composite surface on the field operated turbine component;
    providing a second portion including the ceramic matrix composite, the second portion being a repurposed portion of another field operated component, the second portion having a second exposed ceramic matrix composite surface including a conformation adapted to mate with the first exposed ceramic matrix composite surface;
    positioning the second portion in association with the field operated turbine component so as to replace the first portion, the first exposed ceramic matrix composite surface and the second exposed ceramic matrix composite surface being arranged and conformed to define a joint;
    joining the second portion and the field operated turbine component to form a treated turbine component; and
    applying a second environmental barrier coating to the treated turbine component.

20. The method of claim 19, wherein joining the second portion and the field operated component includes melt infiltration.

* * * * *